FERRITE MAGNETS

Original Filed April 11, 1961

WITNESSES

Leon D. Papa

H M Snyder

INVENTOR

Alexander W. Cochardt

BY

Frederick Shapoe

ATTORNEY

United States Patent Office

Re. 26,153
Reissued Jan. 31, 1967

26,153
FERRITE MAGNETS

Alexander W. Cochardt, Export, Pa., assignor to Westinghouse Electric Corporation, East Pittsburgh, Pa., a corporation of Pennsylvania Original No. 3,113,927, dated Dec. 10, 1963, Ser. No. 102,190, Apr. 11, 1961. Application for reissue Dec. 9, 1965, Ser. No. 517,173
Claims priority, application Germany Oct. 18, 1960
10 Claims. (Cl. 252—62.5)

Matter enclosed in heavy brackets [ ] appears in the original patent but forms no part of this reissue specification; matter printed in italics indicates the additions made by reissue.

This invention relates to novel ferrite permanent magnet materials which are characterized by unusually high coercive force and remanence and are made from relatively inexpensive raw materials.

This application is based upon my German application C-22,553, filed October 18, 1960.

Among the known ferromagnetic materials barium ferrite, has achieved the highest commercial importance. This material, having the chemical formula $BaFe_{12}O_{19}$, has a hexagonal crystal lattice structure which is known as the "magnetoplumbite" structure. Other ferromagnetic materials having a similar structure such as strontium ferrite ($SrFe_{12}O_{19}$) and lead ferrite ($PbFe_{12}O_{19}$) are known, but have not yet attained any importance commercially. The properties of the magnetoplumbites, in which the barium, strontium, or lead oxide and the iron oxide are in approximate ratio of 1:6 moles, their crystal structure, and methods for their manufacture have been carefully investigated and are disclosed in numerous patents and publications. The barium ferrite magnets which are commercially available, have superseded for many applications the metallic magnets of the prior art because of their better magnetic performance, their lower density and the low cost of production.

The work which has been done in the field on magnetoplumbites has largely been limited to the pure oxide materials. For the most part the investigations have been concerned with two-component systems of the magnetoplumbites, and more complex systems have largely been ignored in the prior art. It is with these more complex ferrite materials with which the present invention is concerned.

Pure strontium carbonate has been used in the past in making the known strontium ferrite magnets. The magnets made with this pure strontium carbonate have been found to be inferior in magnetic properties to the commercial barium ferrite magnets.

It is a principal object of this invention to provide sintered permanent magnet bodies of a modified strontium ferrite composition comprising as the principal constituents strontium oxide and iron oxide, in predetermined proportions, and having relatively large amounts of modifying components therein, the magnetic bodies having a high magnetic energy.

It is a further object of this invention to provide a process for making ferrite magnetic materials from iron oxide and a complex strontium carbonate-sulfate derived from the mineral celestite or from other mixed sulfate strontium containing material.

It is a further object of this invention to provide a method of preparing an anistropic ferromagnetic body composed of strontium oxide and iron oxide in predetermined proportions with a substantial amount of modifying components therein, from an intimate mixture of powders including complex strontium carbonate-sulfate derived from the mineral celestite or other mixed strontium sulfates and iron oxide in predetermined proportion, which comprises, calcining the mixture, comminuting the calcined mixture to a fine particle size, shaping the powder to a predetermined configuration in a magnetic field, and sintering.

Other objects of the invention will, in part, be obvious, and will, in part, appear hereinafter.

For a better understanding of the nature and objects of this invention, reference should be had to the following detailed description and drawings, in which.

Figure 1:
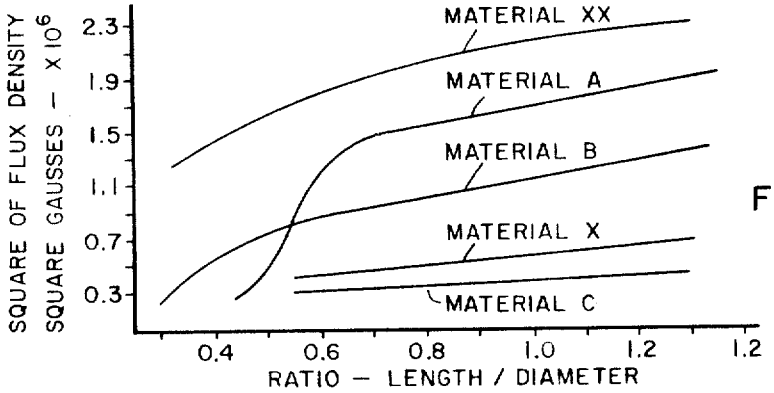
FIGURE 1 is a graph in which the square of the magnetic flux density is plotted against the length/diameter ratio for both the magnets of this invention and certain prior art magnets.

Certain arbitrary terms are used in the following description to designate the materials important in the manufacture of the modified strontium ferrite magnets of this invention. The term "mixed sulfates" is used to describe raw materials, such as the mineral celestite, which provide the mixture of strontium sulfate, other alkaline earth sulfates, carbonates and oxides necessary to the process. The term "complex strontium carbonate-sulfate" is employed to describe the intermediate product, which is principally strontium carbonate but includes other carbonates and sulfates, obtained by reducing the mixed sulfates to sulfides and reacting the latter with a water soluble carbonate.

The invention is particularly directed to a modified strontium ferrite permanent magnet having a sintered body composed of a crystalline material consisting of, by weight, from 7% to 18% of SrO, from 0.1% to 2% of $SrSO_4$, up to 1% of BaO, from 0.01% to1% of CaO, and the balance being $Fe_2O_3$. It is preferred to have small amounts of other constituents in the material including up to 1% of a compound selected from the group consisting of $CaSO_4$, $BaSO_4$, and $Na_2O$, and up to 2% of at least one of the compounds selected from the group consisting of $SiO_2$ and $Al_2O_3$. The material may also include up to 13%, by weight, of PbO in some cases.

A particular method of making modified strontium ferrite anisotropic permanent magnets having the above composition also forms a part of this invention. This method comprises the steps of, mixing from 10% to 25% by weight, and preferably from 13% to 17%, of a complex strontium carbonate-sulfate with finely powdered $Fe_2O_3$, calcining the mixture in an oxidizing atmosphere at a temperature of from 1250° C. to 1400° C., rapidly cooling the calcined material to room temperature, comminuting the calcined material to obtain a powder having an average particle size of from about 1 to 20 microns, suspending the powder in a liquid carrier, compacting the powder while suspended in the liquid carrier in a filter press to pieces of predetermined shape in a magnetic field of at least 500 oersteds, sintering the compacted pieces in an oxidizing atmosphere at temperatures from 1100° C. to 1350° C., cooling the pieces, and magnetizing the pieces.

The invention is further directed to a method for making modified strontium ferrite permanent magnets involving appropriate treatment for the raw materials such as celestite or other mixed sulfates. This method comprises the steps of, reducing the mixed sulfates so that the sulfates contained therein are reduced to sulfides, dissolving the reduced material in water, diluting the solution thus obtained in an aqueous solution of a water soluble carbonate, such as sodium carbonate, to precipitate the desired complex strontium carbonate-sulfate, filtering and drying the precipitate, mixing from 10% to 25% of the complex strontium carbonate-sulfate thus obtained with $Fe_2O_3$, calcining the mixture in an oxidizing atmosphere at a temperature of from 1250° C. to 1400° C., rapidly cooling the calcined material to room temperature, comminuting the calcined material to obtain a powder having a fine particle size, suspending the powder in a liquid such as water, compacting the powder suspension in a press wherein water is filtered out to pieces of predetermined shape in a magnetic field of at least 500 oersteds, sintering the compacted pieces in an oxidizing atmosphere at temperatures from 1100° C. to 1350° C., cooling the pieces, and magnetizing the pieces.

The permanent magnet material of this invention is, as has been indicated above, a magnetoplumbite, a polyoxide composed principally or iron oxide and strontium oxide, but also containing modifying components including a relatively high sulfate content. The sulfate content has been shown to significantly improve the magnetic performance of this material so that the invention is particularly concerned with a modified strontium ferrite, the strontium-containing component of which includes small amounts of sulfate. Modified strontium ferrite is an oxide magnetic material distinguished from all other known permanent magnetic materials by a substantially higher coercive force and remanence, and in addition, it has improved mechanical properties, better temperature stability and increased chemical stability.

The production of the modified strontium ferrite magnets of this invention is particularly simple and inexpensive because sulfate-containing strontium carbonate (complex strontium carbonate-sulfate) may be employed, and a naturally occurring source from which this may be obtained, the mineral celestite, is readily available. Pure materials are thus seen to be unnecessary for the manufacture of these ferrite permanent magnets, and indeed, such pure materials are in fact disadvantageous for this purpose. The strontium-containing raw materials, of which celestite is of primary importance, may also include other sulfates such as barium sulfate, calcium sulfate or sodium sulfate, and carbonates such as calcium carbonate and barium carbonate. Certain other components such as silicon oxide and aluminum oxide may be present in the raw material.

The superiority of the modified strontium ferrite permanent magnets of this invention is based upon the unique chemical characteristics of strontium ferrite containing small amounts of sulfate and oxides. A portion of the sulfate is found in the magnetoplumbite matrix in solution and it is a permanent part of the crystal lattice. This dissolved sulfate has a favorable effect on the permanent magnetic properties. Primarily, it increases the degree of magnetic anisotropy. Strontium sulfate has a smaller free energy of formation than barium sulfate and it is thus more soluble in the magnetoplumbite matrix than barium sulfate. Therefore, sulfate additions in the usual commercial barium ferrite magnets are not as beneficial as when sulfate is present in the modified strontium ferrite. The sulfates which are not in solution are usually present in the material as a finely dispersed second phase. This fine dispersion of sulfates has a highly beneficial effect on the magnetic properties, for the fine particles of sulfate tend to suppress the excessive increase in average grain size which would ordinarily occur at the sintering temperatures and which coarse grain structure would have a deleterious effect on the magnetic properties of the material.

For supplying the strontium oxide portion of the modified strontium ferrite material a complex strontium carbonate-sulfate, which is composed of a high proportion of strontium carbonate, is preferred, and this material should also contain a total content of sulfates in the range of approximately 3% to 4%, which corresponds to a content of approximately 0.5% in the finished magnet. However, it has been found that important improvement in performance of the modified strontium ferrite magnets occurs when the content of sulfates in the complex strontium carbonate-sulfate is in the range from 1% up to as much as 10%.

The mineral celestite which is preferred starting material in the manufacture of the magnets of this invention consists principally of strontium sulfate. It also contains barium sulfate, calcium sulfate, silicon oxide, and aluminum oxide, and the ratio of sulfates in the mineral can differ as much as several percent depending upon the source of the mineral.

The celestite used in the examples set forth in connection with this invention had the following typical composition:

TABLE I.—TYPICAL CHEMICAL ANALYSIS OF THE MINERAL CELESTITE

| | Percent |
|---|---|
| $SrSO_4$ | 94.18 |
| $CaSO_4$ | 1.82 |
| $BaSO_4$ | 2.82 |
| $CaCo_3$ | [1] 0.43 |
| $SiO_2$ | [1] 0.50 |
| $Al_2O_3$ | 0.25 |

[1] Estimated.

The complex strontium carbonate-sulfate obtained from the mineral celestite by a single precipitation process is sold commercially under the names of "strontium carbonate, technical," "impure strontium carbonate," or "strontium carbonate, technical grade" or by similar names. One method of preparing it is set forth below:

Preparation of complex strontium carbonate-sulfate

Seventy-five grams of celestite were intimately mixed with 25 grams of powdered coal. This mixture was heated to 2100° F. (1149° C.) in a nitrogen atmosphere and kept at that temperature for 1 hour. The mixture was then permitted to cool to room temperature and thereafter dissolved in water. The solution obtained in this manner was added to a solution of 5% sodium carbonate in water and the mixture was stirred. The desired complex strontium carbonate-sulfate precipitated out. The precipitate was filtered and dried.

The above procedure is only one of several methods of preparing from celestite the desired complex strontium carbonate-sulfate. While powdered coal was used as the reduction agent in the above method, the celestite may also be reduced by a reducing gas, such as hydrogen, instead of coal. The complex strontium carbonate-sulfate may be precipitated out from the sulfide solution by any other water-soluble carbonate, such as ammonium carbonate.

By the process described above a complex strontium carbonate-sulfate is obtained which contains approximately 89% to 93% of strontium carbonate. A typical chemical analysis of the complex strontium carbonate-sulfate obtained from the mineral celestite by the single precipitation process described is presented in Table II.

TABLE II.—TYPICAL CHEMICAL ANALYSIS OF THE COMPLEX STRONTIUM CARBONATE-SULFATE OBTAINED FROM CELESTITE BY SINGLE REDUCTION AND PRECIPITATION PROCESS

| | Percent |
|---|---|
| $SrCO_3$ | 90.28 |
| $CaCo_3$ | 0.40 |
| $BaCO_3$ | 0.95 |
| $SrSO_4$ | 3.68 |
| $CaSO_4$ | 0.03 |
| $BaSO_4$ | 0.54 |
| $NaSO_4$ | 1.19 |
| $SiO_2$ | 1.97 |
| $Fe_2O_3$ | 0.11 |
| $H_2O$ | 0.66 |

The complex strontium carbonate-sulfate is much cheaper than high purity strontium carbonate, and it reacts more readily with red ferric oxide $Fe_2O_3$, the major component of the magnetic material, than the much more expensive pure strontium carbonate. The permanent magnet of this invention can be sintered using the complex strontium carbonate-sulfate including oxides at relatively low temperatures at which the decomposition of $Fe_2O_3$ does not occur, whereas for sintering of the pure strontium carbonate the temperatures are in the range at which $Fe_2O_3$ will decompose, at least in part, to $Fe_3O_4$, which leads to inferior magnets.

The magnets of this invention are made substantially as follows: between 10% and 25% of the complex strontium carbonate-sulfate and preferably between 13% and 17%, is mixed with finely powdered red iron oxide $Fe_2O_3$, and, as needed, amounts of PbO or BaO and with certain other additions. These additions may include flux agents and grain growth inhibitors. The powders are mixed together with a dispersing agent such as sodium naphthalene sulfate and water to form a slurry which is milled or otherwise treated to produce an intimate dispersion of finely divided particles. The slurry is sieved and then injected into the end of a slowly running rotary calcining furnace and calcined in an oxidizing atmosphere such as air or oxygen at a temperature between 1250° C. and 1400° C., and preferably at 1300° C. If the PbO content is high, the calcining temperature may be as low as 900° C. During calcining, the carbonates of the complex strontium carbonate-sulfate decompose into the respective oxides, but the sulfates do not decompose at the described calcining temperature and atmosphere. The sulfates decompose only at temperatures above 1400° C. as long as the atmosphere does not contain any reducing component. *By reason of the elimination of the carbon dioxide and water present in the complex strontium carbonate-sulfate during the calcining, the percentage of $SiO_2$ in the calcined product is 0.20% when 10% of the complex is mixed with 90% $Fe_2O_3$ to form the ferrite, and 0.53% $SiO_2$ is present in the calcined product when 25% of the complex is mixed with 75% $Fe_2O_3$ to form the ferrite. Small percentages of alumina are present in the magnets, such being derived from the small amounts of $Al_2O_3$ present in celestite as indicated in Table I.*

The various non-magnetic raw materials react during the calcining treatment to form a material capable of being highly magnetic. The material is maintained at the highest temperature in the furnace for ten minutes to obtain complete reaction and then cooled from the calcining temperature to room temperature, preferably at as high a cooling rate as is possible as by quenching in water. The cooled calcined material is crushed in a jaw crusher, milled or ground, screened, dispersed in an aqueous solution to form a slurry, then formed into bodies of the desired shape, such as rings, wafers, discs, cylinders, etc. The slurry is formed to desired shape concurrent with the removal of water by pressing, slip casting, mechanical agitation, rolling or extruding. The shaping or compaction may be performed in a magnetic field if an anisotropic permanent magnet material is desired. For compaction in a magnetic field, the particles should have an average particle diameter of about from 1 to 20 microns. The magnetic field intensity employed should be at least 500 oersteds during the compaction. Of course, if an isotropic material is desired the particles are shaped or compacted without a magnetic field.

The particles of calcined material may be compacted in a dry condition, if desired, but wet compaction is better if the compaction is to be performed in a magnetic field.

In the wet compaction process, the calcined powder mass is mixed with a fluid which is principally water, but which may include one or two percent of a dispersing agent, such as sodium naphthalene sulfate or polyvinylpyrrolidone. The slurry thus formed is enclosed in a die having a movable wall, at least one wall of which die is a filter plate supporting a filter. As the movable wall exerts pressure on the slurry the water is forced through the filter and filter plate, while at the same time the filter prevents escape of the powder particles. Thus, after compacting, there remains in the die a formed ferrite mass having a small amount of moisture associated therewith. It will be appreciated that if the slurry is compacted in a magnetic field that the ferrite particles will readily orient themselves since their freedom of movement is enhanced by the presence of the fluid medium. The wet pressed magnets are subsequently dried in air, preferably in a drying oven, at temperatures of from 50° C. to 250° C.

For wet compaction in a filter press, a pressure for pressing the powders of between 1,000 p.s.i. and 5,000 p.s.i. has been found to be satisfactory. However, greater pressures up to 25 tones per square inch, and lower pressures, may be employed.

When the powders have been compacted in a magnetic field it has been found to be desirable to demagnetize the compacted magnets for subsequent processing thereafter. This demagnetization does not affect the ultimate magnetic properties of the magnets. It merely facilitates handling in further treatment since the demagnetized pressed magnets will not adhere to each other or to other ferromagnetic materials. The compacted pieces are then sintered or fired at a temperature of between 1100° C. and 1350° C., and as low as 900° C. for high PbO contents, in an oxidizing atmosphere, such as air or oxygen. During the sintering operation the magnets become relatively dense bodies. Subsequent to the sintering operation the magnets may be ground, if necessary, to the desired dimensions. Thereafter, they may be washed to remove the waste powdered material produced by the grinding operation. And lastly, they are magnetized in the desired manner. During magnetization of anisotropic material the direction of the magnetizing field must coincide with the direction of the magnetic field used during the compaction operation.

Permanent magnets made in accordance with the above description are in many respects greatly superior to any other known permanent magnets. Particularly, they exhibit a very high coercive force when compared to commercial materials. Thus, they are particularly useful for applications such as motors, generators, polarized relays, holding devices, magnetos, etc. They also exhibit a higher magnetomotive force per unit length than any commercial material and therefore are particularly suitable for applications such as loudspeakers, meters, instruments, magnetrons, separators, magnetic focusing devices, etc. The low density of the permanent magnets of this invention make them particularly desirable for applications where weight is a matter of concern such as in moving magnet instruments and in aircraft applications.

A specific example of the process of making the permanent magnets of this invention, hereinafter designated "material XX" (anisotropic material) and "material X" (isotropic material), is set forth immediately below.

EXAMPLE II 2620 grams of the complex strontium carbonate-sulfate of the composition set forth in Table II, 510 grams of the dispersing agent, sodium naphthalene sulfate, and 8500 cc. of tap water were milled in a ball-mill for 16 hours. 14,380 grams of red iron oxide powder, $Fe_2O_3$, was added and mixed into the complex strontium carbonate-sulfate slurry by further ball-milling for 2 hours, the slip obtained in this manner was screened through a 200 mesh screen and was pumped at a rate of approximately 20 cc./minute into the higher end of a rotary tube furnace rotating at a rate of 4 r.p.m. In this fashion, the mixture was dried almost instantaneously. The mixture passed through the rotary tube furnace in about 30 minutes reaching a temperature of 2400° F. (1315° C.) in the hot zone of the furnace for a period of 10 minutes.

The calcined material was crushed in a jaw crusher, pulverized in a disc grinder, and screened through a 60 mesh screen. 490 grams of the minus 60 mesh powder was then ball-milled with 490 cc. of a 2% solution of the dispersing agent sodium naphthalene sulfate in a 1.7 liter porcelain jar with 2700 grams of steel balls having a diameter of ½ inch. It was ball-milled for 64 hours at a speed of 75 r.p.m.

The ball-milled slurry was pressed in a filter press in a magnetic field of 6,200 oersteds at a pressure of 3200 p.s.i. into cylinders of between approximately 0.25 to 1.0 inch length and 0.72 inch diameter. The pressed magnets were then dried in an oven at 130° C. for 16 hours. The magnets were then heated in oxygen to a sintering temperature of 2300° F. (1259° C.), kept at that temperature for 1 hour, cooled to room temperature, and then magnetized. At the sintering temperature the magnet diameter decreased from 0.72 inch to 0.64 inch; the magnet length decreased approximately 10%.

The magnetic properties of the magnets were tested, and the results were compared with those obtained on commerical barium ferrite samples of the same size and configuration, tested in exactly the same manner. The flux density in gauss was measured 2 mm. away from the center of both faces of each magnet cylinder. The intrinsic coercive force was also measured. The commercial barium ferrite magnets, which had a diameter of 0.63 inch and a length between 0.15 and 0.85 inch, were cut from several different batches of commercially available barium ferrite discs, wafers, and rings.

The square of the magnetic flux density obtained for material XX and material X is compared in FIG. 1 with those obtained on barium ferrite materials A, B and C. Material A is an anisotropic barium ferrite sintered at high temperature which is used particularly for loudspeaker magnets, for holding magnets and tramp iron separator magnets. Marterial B is an anisotropic barium ferrite sintered at a relatively lower temperature used for focusing magnets of traveling wave tubes and applications in which the magnetic material is exposed to strong demagnetizing fields or to large temperature variations. Material C is the isotropic barium ferrite, a material of lesser importance.

The square of the flux density, which is proportional to the magnetic field energy, is plotted in FIG. 1 against the length/diameter ratio. The points from which the curves are plotted each represent the average of two measurements taken on both faces of the magnet cylinder.

It is evident from FIG. 1 that material XX is greatly superior to commercial barium ferrite materials tested for all length/diameter ratios. At the crossover point between the barium ferrite material A curve and the barium ferrite material B curve, which occurs at a length/diameter ratio of 0.55, material XX exhibits more than twice the energy of both commercial barium ferrite materials. At very low length/diameter ratios or what is equivalent, at low permeance coefficients, material XX exhibits even greater superiority. This is due to its high coercive force which is not directly illustrated by the curves in FIG. 1. Isotropic material X is also seen to be better than the isotropic barium ferrite material C. At very large values of the length/diameter ratio, which are seldom used in practice, the difference between the two curves for material XX and barium ferrite material A becomes smaller.

It is evident from FIG. 1 that material XX is particularly suitable for applications requiring a small length/diameter ratio or, to put it another way, applications where the permeance coefficient is low. In these applications the material operates at the lower end of the demagnetization curve. One application of this type is the permanent magnet in a magnetic focusing device with periodic field, particularly when the period must be short and the field energy high. A traveling wave tube is another such device. There are other similar applications. Material XX is better than the best barium ferrite material by a factor of two whenever the permeance coefficient must be smaller than approximately 1.

Material XX and the other permanent magnet materials of this invention are even better than is immediately apparent from the curves of FIG. 1. The high coercive force enables these materials to withstand large demagnetizing forces. These materials also have superior low temperature behavior. Under practical operating conditions barium ferrite material B and especially barium ferrite material A cannot be employed at the point of their maximum energy product due to irreversible flux temperature changes. As an example, a radio with a barium ferrite material A loudspeaker magnet will not operate properly on a cold winter day, or thereafter, if the barium ferrite material A is designed to operate at its maximum energy point at room temperature. The barium ferrite magnet must be made thicker, depending on the lowest temperature at which it must operate. If the lowest temperature is −15° C. a barium ferrite material A magnet must be 50% thicker than under conditions in which it would operate only at room temperature. If the lowest temperature is −40° C., the magnet must be twice as thick as would be necessary under room temperature conditions. Thus, the usable magnetic energy per volume for barium ferrite material A and to a lesser extent for barium ferrite material B is reduced wherever the magnet must be designed to operate at low temperature. These irreversible flux changes are associated with the decrease in coercive force at lower temperatures. Since the coercive force of material XX is so high, material XX can be operated close to its maximum energy point. Therefore, the usable energy per unit volume in a typical application for material X is substantially larger, especially when compared to barium ferrite material B than is apparent from the curves in FIG. 1.

Material XX is also somewhat better than is apparent from the curves in FIG. 1 because it is a highly stable material. Permanent magnets are not completely stable, even if maintained at a constant temperature. Their flux density tends to decrease with time due to a mechanical shock and for other reasons. It is generally recognized that the higher the coercive force of a magnetic material, the more stable is the permanent magnet made from that material. Thus, material XX has greater stability than the metallic magnets and the barium ferrite magnets.

Figure 2:
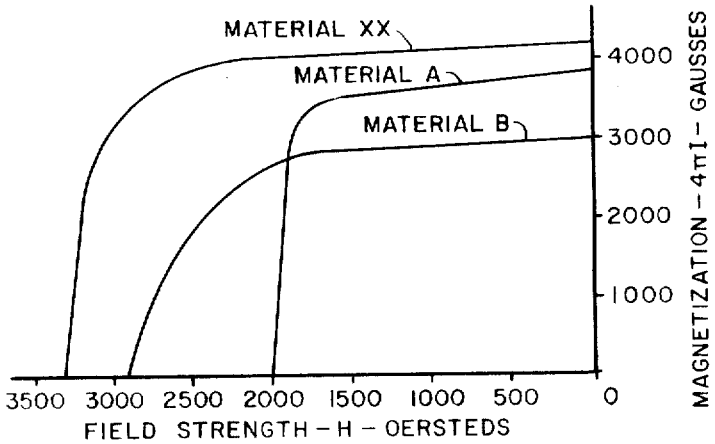
FIG. 2 is a graph in which magnetization is plotted against the demagnetizing force for both the magnets of this invention and certain prior art magnets; and, FIG. 3 is a graph in which flux density is plotted against the demagnetizing force, for both magnets of this invention and certain magnets of the prior art.
Figure 3:
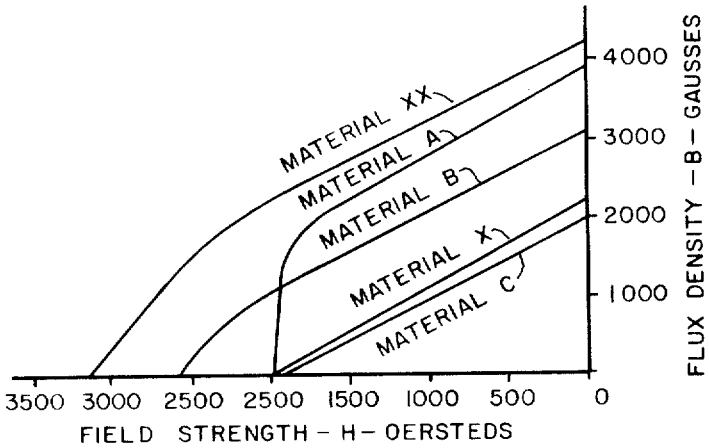

The superiority of material XX is also evident in the more conventional tests illustrated in FIGS. 2 and 3. FIG. 2 shows demagnetizing curves in which the magnetization $4\pi I$ is plotted against the demagnetization force H in oersteds. FIG. 3 shows demagnetization curves in which the flux density B is plotted against the demagnetizing force H in oersteds. The anisotropic material XX in these figures is compared with the typical commercial barium ferrite materials A, B and C, and with the isotropic strontium ferrite of this invention, material X. Material XX exhibits a residual flux density ($B_r$) of 4200 gauss, a coercive force ($H_c$) of 3100 oersteds, and a maximum energy product $(B\times H)_M$ of $4.2\times10^6$ gauss oersteds. Each of these properties of material XX is higher than the similar properties of the materials compared with it.

In treating the powdered materials required for the manufacture of these permanent magnets, the conventional dispersing agents used in the ceramic industry facilitate the mixing, the ball-milling, and the pressing of the compacts, and have little direct effect on the magnetic properties of the ultimate magnets. Dispersing agents such as high polymer sodium salts of napthalene sulfuric acids are preferable for use in the process of this invention but other commerical dispersing agents used in the ceramic industry are satisfactory.

Many of the conventional flux agents used in the ceramic industry have pronounced effects on the magnetic and physical properties of material XX. They lower the calcining and sintering temperatures, increase the densities, and improve the mechanical strength of material XX. The common flux agents, such as lithium fluoride, lithium carbonate, calcium fluoride, sodium borate, calcium borate, boric acid, feldspars, lead silicate and mixtures of them may be added up to 1%. Lead oxide (PbO) may be added in relatively large amounts. PbO in amounts of the order 1% increases the density and mechanical strength of the magnet by modifying the magnetoplumbite lattice, while larger amounts lower the calcination and sintering temperatures. The finished magnet may contain as much as 13% PbO.

Barium oxide may be added to replace all or part of the PbO, without significantly affecting the magnetic properties. The same holds for calcium oxide, however, much smaller amounts are involved. For instance, the finished magnets may contain up to 7% of BaO, and up to 3% of CaO.

It may be desirable to add grain growth inhibitors to restrict grain growth, particularly if the celestite or the red iron oxide raw materials contain less than 1% of combined non-iron, non-earth alkali oxides, such as silica, alumina, etc. Silica, alumina or mixtures of them are preferable as grain growth inhibitors, but any compound or mixture of compounds which is stable at 2400° F. and insoluble or only slightly soluble in the matrix of material XX may be added in amounts of up to 1%. It has been found that the magnetic properties of the ferrite magnets are dependent on crystal size with crystals of small size being particularly beneficial. A fine dispersion of an impurity such as alumina ($Al_2O_3$) tends to tie down crystals and suppress their growth even during sintering where conditions are favorable for crystal growth.

Many metallic oxides and compounds are soluble in the ferrite compositions of the permanent magnets described hereinbefore, and they are capable of improving the magnetic properties if added in small quantities. Up to 6% of $TiO_2$, $SnO_2$, and/or $Sb_2O_5$ improve the magnetic properties of these ferrites. Up to 2% of one of the following compounds or mixtures thereof may also be added: $As_2O_5$, BeO, $Bi_2O_3$, $B_2O_3$,CdO, $CeO_2$, $Cs_2O$, $Cr_2O_3$, CoO, $Co_2O_3$, CuO, $DO_2$ (where D stands for didymium), FeO, $PbCrO_4Li_2O$, MgO, MnO, $MoO_3$, NiO, $Nb_2O_3$, $Nb_2O_5$, $K_2O$, $Na_2O$, $WO_3$, $V_2O_5$, ZnO, $ZrO_2$, and up to 2% of the common rare earth oxide mixture that is sold commercially as rare earth oxide.

There have thus been described modified strontium ferrite materials which are substantially better magnetically than materials of this class which are currently commercially available.

The modified strontium ferrite material of this invention in the calcined but unsintered condition, which has been crushed and pulverized to a fine particle size, may be mixed with an organic or inorganic binder such as Bakelite, polyvinyl chloride, butyl rubber, epoxy resins and plaster to produce a body of material containing a uniform dispersion of ferrite powder therein. The body of material, either in the solid or plastic condition, is subjected to a magnetic field to magnetize the ferrite powder and thereby produce a magnetic body. If the magnetic field is applied to a body of material in which the binder and ferrite powder form a solid mass, an isotropic magnet will be produced. If the binder is in the plastic condition, the ferrite powder particles will assume a preferred orientation in the magnetic field, and, when the binder has hardened, an anisotropic magnet is the result. It contains from 75% to 95% by weight of ferrite.

Unsintered modified strontium ferrite powder does not have the remarkably high magnetic properties characteristic of sintered modified strontium ferrite bodies, but, nevertheless, the magnetic properties are better than those of unsintered barium ferrite powder. Bonded powder modified strontium ferrite material, made as described above, are very useful for many applications.

It is to be understood that the compositions and method described are to be interpreted as exemplary and not limiting.

I claim as my invention:

1. A permanent magnet comprising a sintered body composed of a crystalline material consisting of, by weight, from 7% to 18% of SrO, from 0.1% to 2% of $SrSO_4$, up to 1% of BaO, up to 1% of CaO, and the balance being $Fe_2O_3$.

2. The magnet of claim 1 containing PbO in amounts of up to 13%.

3. A permanent magnet comprising a sintered body composed of a crystalline material consisting of, by weight, from 7% to 18% of SrO, from 0.1% to 2% of $SrSO_4$, up to 1% of BaO, up to 1% of CaO, up to 1% of a compound selected from the group consisting of $CaSO_4$, $BaSO_4$, and $Na_2O$, up to 2% of at least one of the compounds selected from the group consisting of $SiO_2$ and $Al_2O_3$, and the balance being $Fe_2O_3$.

4. The magnet of claim 3 containing PbO in amounts of up to 13%.

*5. The magnet of claim 1, wherein from 0.20% to 0.53% of $SiO_2$ is present.*

*6. The magnet of claim 1 wherein up to 1% of at least one compound from the group of $SiO_2$ and $Al_2O_3$ is present to function as a grain growth inhibitor.*

*7. A permanent magnet comprising a sintered body composed of, by weight, from 7% to 18% of SrO, up to 1% $Na_2O$, up to 7% BaO, up to 3% CaO, a grain growth inhibitor selected from the group consisting of $SiO_2$ and $Al_2O_3$ in an amount of about 0.20% to 2%, and the balance being essentially $Fe_2O_3$, the sintered body characterized in that there are present sulfate compounds, the total sulfate content being calculated as strontium, barium and calcium sulfates, in an amount corresponding to from 0.1% to 2% of $SrSO_4$, up to 1% $BaSO_4$ and up to 1% $CaSO_4$.*

*8. A permanent magnet body comprising a matrix selected from the group consisting of organic and inorganic binders in which are dispersed fine magnetic particles, the magnetic ferrite particles having the composition, by weight, of from 7% to 18% of SrO, up to 1% $Na_2O$, up to 7% BaO, up to 3% CaO, up to 2% of at least one compound selected from the group consisting of $SiO_2$ and $Al_2O_3$, the balance being essentially $Fe_2O_3$, the ferrite particles characterized in that there are present sulfate compounds, the total sulfate compound being calculated as strontium, barium and calcium sulfates, in an amount corresponding to from 0.1% to 2% of $SrSO_4$, up to 1% $BaSO_4$ and up to 1% $CaSO_4$.*

*9. The magnet body of claim 9 wherein the ferrite particles are oriented in the binder to produce an anisotropic magnet body.*

*10. Permanent magnet powder having a fine particle size of the composition, by weight, from 7% to 18% SrO, up to 1% $Na_2O$, up to 7% BaO, up to 3% CaO, up to 2% of at least one compound selected from the group consisting of $SiO_2$ and $Al_2O_3$, the balance being essentially $Fe_2O_3$, the powder particles characterized in that there are present sulfate compounds, the total sulfate compound being calculated as strontium, barium and calcium sulfates, in an amount corresponding to from 0.1% to 2% of $SrSO_4$, up to 1% $BaSO_4$ and up to 1% $CaSO_4$.*

References Cited by the Examiner

The following references, cited by the Examiner, are of record in the patented file of this patent or the original patent.

UNITED STATES PATENTS

| | | | |
|---|---|---|---|
| 2,900,344 | 8/1959 | Stuyts et al. | 252—62.5 |
| 2,960,470 | 11/1960 | Loosjes et al. | 252—62.5 |
| 2,960,471 | 11/1960 | Gorter | 252—62.5 |

TOBIAS E. LEVOW, *Primary Examiner.*

R. D. EDMONDS, *Assistant Examiner.*